United States Patent
Shimura

(10) Patent No.: US 6,356,322 B1
(45) Date of Patent: *Mar. 12, 2002

(54) LIQUID CRYSTAL DISPLAY SYSTEM WITH IMPROVED CONTRAST AND LESS DEPENDENCE ON VISUAL ANGLE

(75) Inventor: Kazuo Shimura, Kanagawa-ken (JP)

(73) Assignee: Fuji Photo Film Co., Ltd., Kanagawa-Ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,391

(22) Filed: Sep. 30, 1997

(30) Foreign Application Priority Data

| Sep. 30, 1996 | (JP) | 8-258000 |
| Sep. 30, 1996 | (JP) | 8-258039 |
| Sep. 30, 1996 | (JP) | 8-258040 |

(51) Int. Cl.$^7$ .............................. G02F 1/13
(52) U.S. Cl. .................. 349/65; 349/112
(58) Field of Search .............. 349/117, 5, 65, 349/64, 62, 61, 57, 119

(56) References Cited

U.S. PATENT DOCUMENTS

| 3,578,841 | A | * | 5/1971 | Elmer | |
| 4,883,343 | A | * | 11/1989 | Teshirogi | 349/137 |
| 4,984,872 | A | * | 1/1991 | Vick | 349/112 |
| 4,984,874 | A | * | 1/1991 | Yamamoto | 349/119 |
| 5,115,305 | A | * | 5/1992 | Baur et al. | 349/9 |
| 5,157,523 | A | * | 10/1992 | Yamagishi et al. | 349/119 |
| 5,194,975 | A | * | 3/1993 | Akatsuka et al. | 349/119 |
| 5,200,843 | A | * | 4/1993 | Karasawa et al. | 349/9 |
| 5,272,496 | A | * | 12/1993 | Nicolas | 349/9 |
| 5,283,600 | A | * | 2/1994 | Imai | 349/9 |
| 5,396,350 | A | * | 3/1995 | Beeson et al. | |
| 5,467,154 | A | * | 11/1995 | Gale et al. | 353/119 |
| 5,598,281 | A | * | 1/1997 | Zimmerman et al. | 349/5 |
| 5,657,140 | A | * | 8/1997 | Xu et al. | 349/118 |
| 5,691,788 | A | * | 11/1997 | Kim | 349/96 |
| 5,745,199 | A | * | 4/1998 | Suzuki et al. | 349/95 |
| 5,854,872 | A | * | 12/1998 | Tai | 385/133 |
| 5,859,681 | A | * | 1/1999 | VanderPloeg et al. | 349/120 |
| 5,877,829 | A | * | 3/1999 | Ohamoto et al. | 349/74 |
| 6,002,829 | A | * | 12/1999 | Winston et al. | 385/146 |
| 6,023,317 | A | * | 2/2000 | Xu et al. | 349/120 |

FOREIGN PATENT DOCUMENTS

JP 589537 6/1983

* cited by examiner

*Primary Examiner*—Kenneth Parker
(74) *Attorney, Agent, or Firm*—Sughrue Mion, PLLC

(57) ABSTRACT

A liquid crystal display system includes a liquid crystal cell system formed by sandwiching liquid crystal between first and second transparent electrode substrates and a light source for projecting substantially collimated light onto the first transparent electrode substrate. An image is viewed from the second transparent electrode substrate side. A phase-contrast film is provided on each of the first transparent electrode substrate side and the second transparent electrode substrate side of the liquid crystal cell system and a light dispersing layer is provided on the second transparent electrode substrate side of the liquid crystal cell system. The light source includes a point light source disposed in a position where it is near the first transparent electrode substrate and does not face the first transparent electrode substrate, a collimating optical system which collimates light emitted from the point light source to parallel light travelling in parallel to the first transparent electrode substrate and a reflecting mirror which is disposed facing the first transparent electrode substrate and reflects the parallel light to impinge upon the first transparent electrode substrate in perpendicular to the substrate.

15 Claims, 3 Drawing Sheets

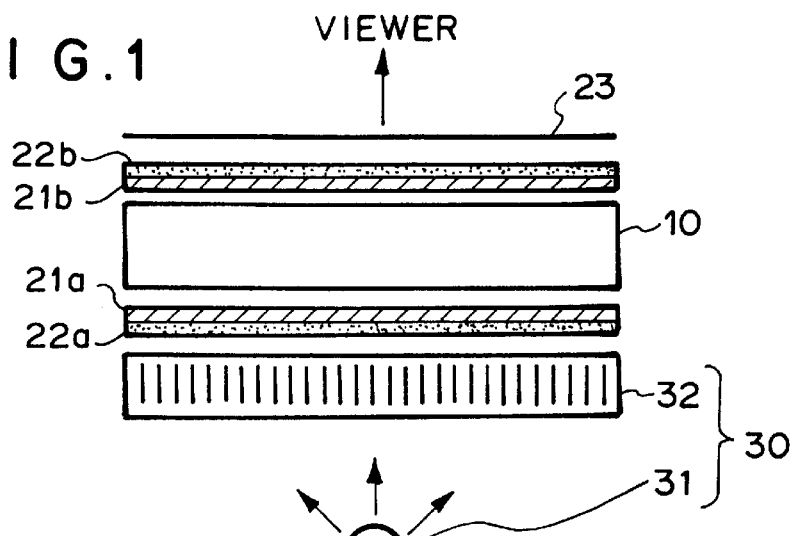
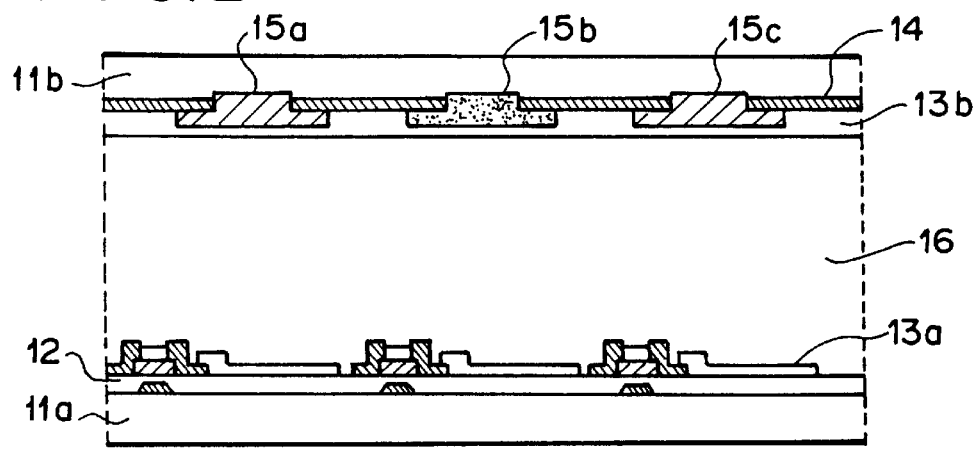
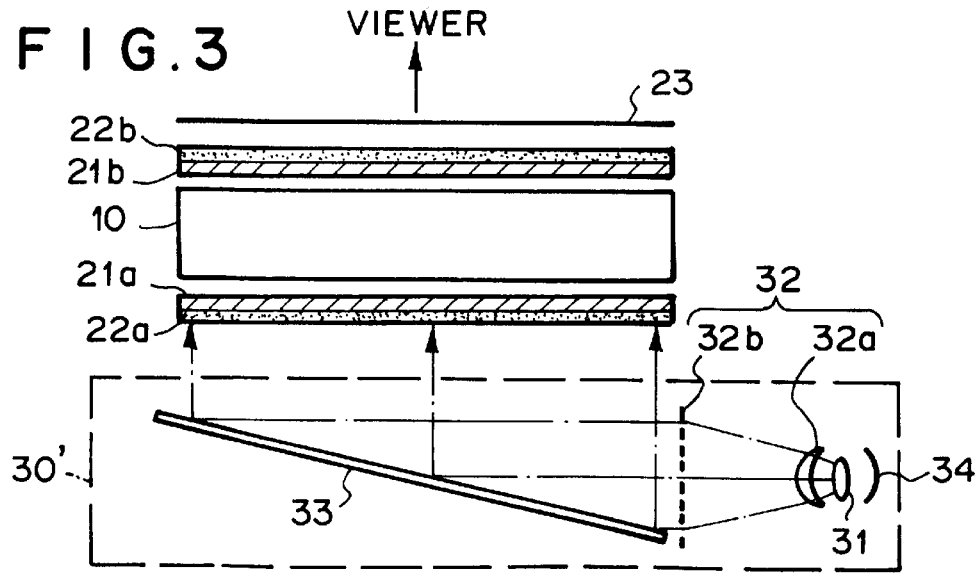

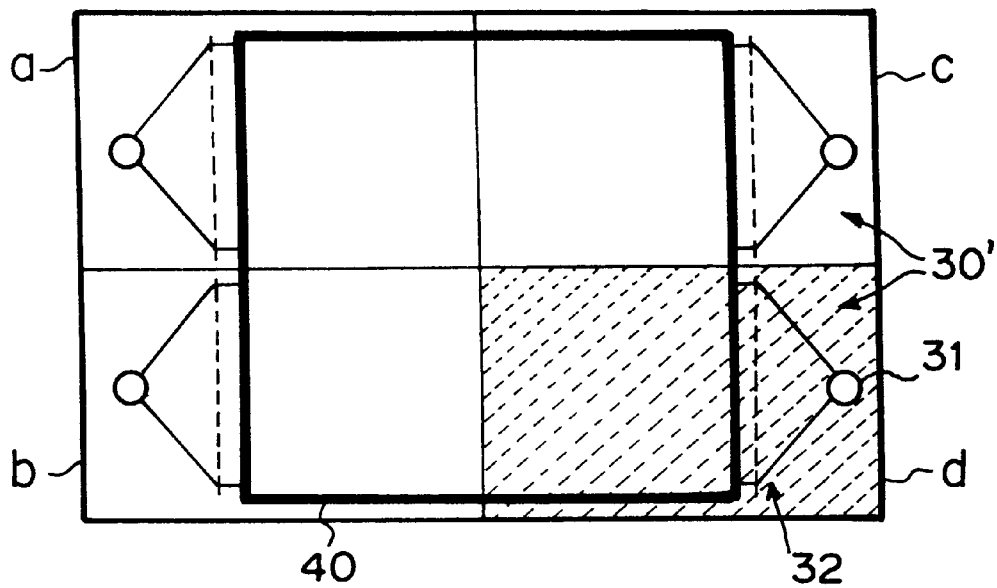
F I G. 4A
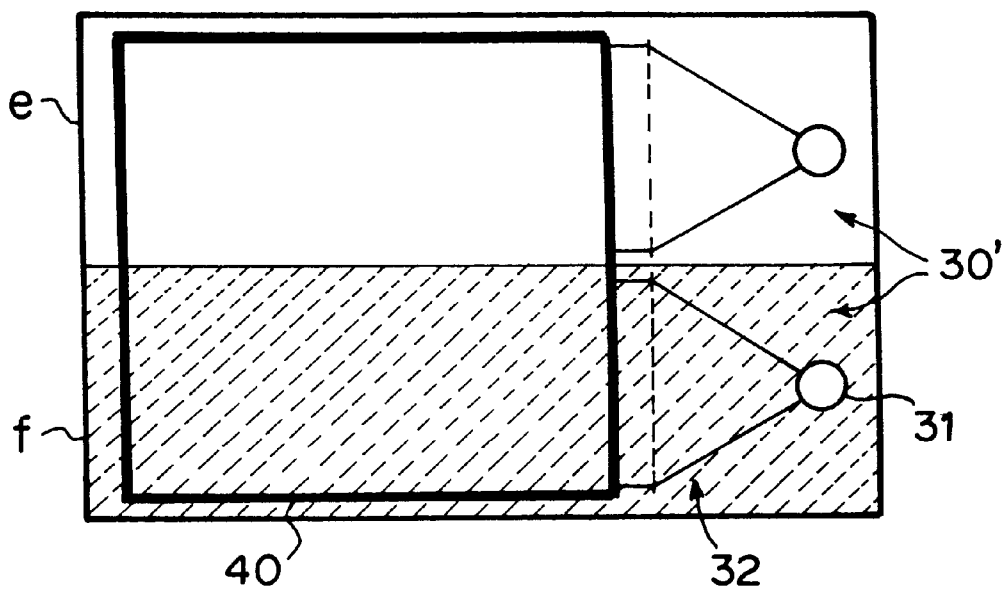
F I G. 4B

LIQUID CRYSTAL DISPLAY SYSTEM WITH IMPROVED CONTRAST AND LESS DEPENDENCE ON VISUAL ANGLE

BACKGROUND OF THE INVENTION

1. Field of the Invention

This invention relates to an image display system, and more particularly to an liquid crystal image display system whose dependence on the visual angle and contrast are improved. This invention further relates to an image display system which conforms to the visual sense of viewers.

2. Description of the Related Art

Liquid crystal displays are widely used in notebook computers, electronic pocketbooks, car navigators and the like.

Among such liquid crystal displays, a twisted nematic mode liquid crystal displays are most widely used. The twisted nematic mode liquid crystal display generally comprises a pair of glass substrates having transparent electrodes, liquid crystal cells which are disposed between the glass substrates and contain liquid crystal molecules twisted by 90° and a pair of polarizing plates which are disposed on the outer sides of the respective glass substrates with their directions perpendicular to each other. Display of images is effected by controlling the electric voltage applied across the substrates, thereby changing the orientation of the liquid crystal molecules so that the output of light passing through the liquid crystal cell changes. That is, when the electric voltage applied is lower than a threshold voltage, the polarization direction of linearly polarized light passing through the light incident side polarizing plate is rotated by 90° along twist of the liquid crystal molecules and accordingly the light passing through the light incident side polarizing plate can pass through the light emanating side polarizing plate which is disposed perpendicular to the light incident side polarizing plate, whereby a bright spot is displayed. On the other hand, as the electric voltage becomes higher than the threshold voltage, the major axes of the liquid crystal molecules begin to erect from the middle portion between the electrodes and the optical activity begins to deteriorate. As the electric voltage is further increased, the optical activity is finally nullified, light passing through the light incident side polarizing plate impinges upon the light emanating side polarizing plate without rotated and accordingly cannot pass the light emanating side polarizing plate, whereby a dark spot is displayed.

Generally the liquid crystal displays are divided into a simple matrix and an active matrix according to the system for applying an electric voltage to each picture element. Those most widely used at present are a super twisted nematic mode liquid crystal display of the simple matrix and a thin film transistor liquid crystal display of the active matrix. However there have been known liquid crystal displays of other various modes.

In the conventional liquid crystal image display systems, there have been a problem that the gradation of the image changes depending on the visual angle and the contrast is low. In order to overcome such a problem, there have been proposed a liquid crystal image display system in which a light guide layer and a light dispersing layer are provided on the cells in order to lessen dependence on the visual angle (Japanese Unexamined Patent Publication No. 58(1983)-95378) and a liquid crystal image display system in which parallel light is projected in order to lessen dependence on the visual angle and increase the contrast.

However, practically it is very difficult to completely collimate light and actually light containing components directed in multiple are projected onto the liquid crystal display, which results in deterioration in contrast since images produced by oblique components are superposed on the image produced by vertical components.

Further when light from a light source is completely collimated, the efficiency of utilization of light from the light source deteriorates and brightness is lowered.

Further it has been proposed to provide phase-contrast film on the liquid crystal to lessen change in gradation depending on the visual angle. However even this approach cannot completely overcome the problem of dependence on the visual angle.

Further conventional image display systems are not designed taking into account characteristics of human visual response. That is, since the eyes are arranged in a horizontal direction, the visual response in the horizontal direction is higher than that in the vertical direction and humans can recognize in more detail in the horizontal direction. However in the conventional image display systems, the density and the shape of picture elements are the same in the horizontal direction and the vertical direction. Accordingly, there sometimes happens that information displayed in the horizontal direction is poor for the human visual response in the horizontal direction and information displayed in the vertical direction is too much for the human visual response in the vertical direction.

SUMMARY OF THE INVENTION

In view of the foregoing observations and description, the primary object of the present invention is to provide a liquid crystal display which is free from dependence on the visual angle and can display a high contrast image.

Another object of the present invention is to provide an image display system which conforms to the visual sense of viewers.

In accordance with a first aspect of the present invention, there is provided a liquid crystal display system comprising a liquid crystal cell system formed by sandwiching liquid crystal between first and second transparent electrode substrates and a light source for projecting substantially collimated light onto the first transparent electrode substrate, an image being viewed from the second transparent electrode substrate side, wherein the improvement comprises that an optical compensation means is provided on each of the first transparent electrode substrate side and the second transparent electrode substrate side of the liquid crystal cell system, and a light dispersing layer is provided on the second transparent electrode substrate side of the liquid crystal cell system.

The "substantially collimated light" may include components which are at a slight angle to the parallel components.

In the liquid crystal image display system in accordance with the first aspect of the present invention, the optical characteristics of the components at a slight angle to the parallel components are corrected to substantially the same as those of the parallel components by virtue of the optical compensation means disposed on the light incident side and the light emanating side of the liquid crystal cell system, whereby a high contrast image can be displayed. Further by virtue of the light dispersing layer provided on the light emanating side of the liquid crystal cell system, the visual angle-dependence is lessened.

The liquid crystal may be of various types such as twisted nematic liquid crystal.

In accordance with a second aspect of the present invention, there is provided a liquid crystal display system comprising a liquid crystal cell system formed by sandwiching liquid crystal between first and second transparent electrode substrates and a light projecting means for projecting light onto the first transparent electrode substrate, an image being viewed from the second transparent electrode substrate side, wherein the improvement comprises that said light projecting means is disposed on the first transparent electrode substrate side adjacent thereto and comprises a point light source disposed in a position where it is near the first transparent electrode substrate and does not face the first transparent electrode substrate, a collimating optical system which collimates light emitted from the point light source to parallel light travelling in parallel to the first transparent electrode substrate and a reflecting mirror which is disposed facing the first transparent electrode substrate and reflects the parallel light to impinge upon the first transparent electrode substrate in perpendicular thereto, and a light dispersing layer is provided on the second transparent electrode substrate side of the liquid crystal cell system.

Said "position where the point light source is near the first transparent electrode substrate and does not face the first transparent electrode substrate" is for example a position beside the reflecting mirror which is disposed facing the first transparent electrode substrate.

The collimating optical system may comprise, for instance, a Fresnel lens disposed in perpendicular to the first transparent electrode substrate near thereto and a condenser lens which directs light emitted from the point light source toward the Fresnel lens.

An optical compensation means may be provided on the first transparent electrode substrate side of the liquid crystal cell system with another optical compensation means provided on the second transparent electrode substrate side of the liquid crystal cell system between the light dispersing layer and the liquid crystal cell system.

The liquid crystal cell system may be divided into a plurality of regions and a light projecting means may be provided for each region. That is, a plurality of light projecting means may be provided for one liquid crystal panel. In this case, two or more point light sources may share one reflecting mirror.

The liquid crystal may be of various types such as twisted nematic liquid crystal.

In accordance with the second aspect of the present invention, by collimating light emitted from the point source by the optical system, the light projected onto the first transparent electrode substrate can be parallel light containing less oblique components. Further the efficiency of utilization of light from the light source can be high, whereby power consumption can be reduced.

Further since the light projecting means comprises a point light source which emits light in parallel to the substrates and a reflecting mirror which reflects the light in perpendicular to the substrates, the light projecting means can be small in thickness.

By causing light containing less oblique components to impinge upon the liquid crystal cell system, a high contrast image can be displayed. Further by virtue of the light dispersing layer provided on the light emanating side of the liquid crystal cell system, the visual angle-dependence is lessened.

In accordance with a third aspect of the present invention, there is provided an image display system in which an image signal is reproduced as a visual image on a pixelized screen having a number of picture elements arranged in horizontal and vertical directions, wherein the improvement comprises that the density of the picture elements in the horizontal direction is higher than that in the vertical direction.

It is preferred that the dimension in the vertical direction of each picture element be larger than that in the horizontal direction.

The image signal may be one on which picture element density conversion processing for causing the density of the picture elements in the horizontal direction to be higher than that in the vertical direction has been carried out, one read out in such a manner that the density of the picture elements in the horizontal direction becomes higher than that in the vertical direction, one read out on the basis of picture elements whose dimensions are larger in the vertical direction than in the horizontal direction, or one read out on the basis of picture elements whose dimensions are larger in the vertical direction than in the horizontal direction and at the same time whose density is higher in the horizontal direction than in the vertical direction.

Preferably the density of the picture elements in the horizontal direction is at least 1.2 times as high as that in the vertical direction and more preferably three times as high as that in the vertical direction.

Preferably the dimension of each picture element in the vertical direction is at least 1.2 times as large as that in the horizontal direction and more preferably three times as large as that in the horizontal direction.

The image display system may be of any type including those using liquid crystal, CRT, FED or EL.

It is preferred that a maximum brightness exceeds 800 nit.

When the density of the picture elements in the horizontal direction is higher than that in the vertical direction and the dimension in the vertical direction of each picture element is larger than that in the horizontal direction, the response in the horizontal direction in a high frequency range becomes higher and display conforming to the visual sense of viewers can be achieved.

BRIEF DESCRIPTION OF THE DRAWINGS

FIG. 1 is a schematic cross-sectional view of a liquid crystal image display system in accordance with a first embodiment of the present invention, FIG. 2 is a fragmentary cross-sectional view showing one picture element of the image display system shown in FIG. 1, FIG. 3 is a schematic cross-sectional view of a liquid crystal image display system in accordance with a second embodiment of the present invention, FIGS. 4A and 4B respectively show modifications of the image display system shown in FIG. 3.

DESCRIPTION OF THE PREFERRED EMBODIMENT

Figure 5:
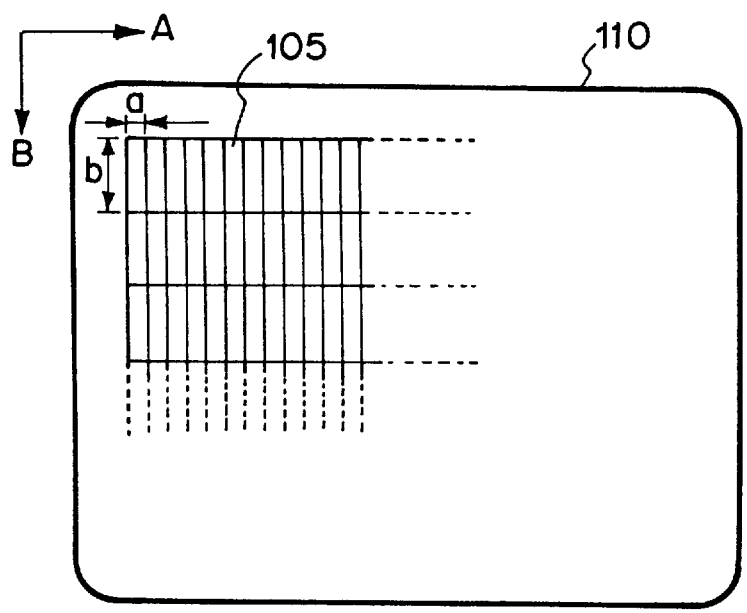
FIG. 5 is a view for illustrating an image display system in accordance with a third embodiment of the present invention.

As shown in FIG. 1, a liquid crystal image display system in accordance with a first embodiment of the present invention comprises a liquid crystal cell system 10, first and second phase-contrast films (optical compensation means) 21a and 21b respectively disposed on opposite sides of the liquid crystal cell system 10, first and second polarizing plates 22a and 22b which are respectively disposed on the outer sides of the phase-contrast films 21a and 21b, a light dispersing layer 23 formed on the outer side of the second polarizing plate 22b and a light projecting means 30 disposed on the outer side of the first polarizing plate 22a.

In this particular embodiment, the liquid crystal cell system 10 is of a tin film transistor type employing twisted nematic liquid crystal.

As shown in FIG. 2, which is a cross-sectional view showing one picture element of the liquid crystal cell system 10, the cell system 10 has a light incident side glass substrate 11a on which amorphous silicon tin film transistors 12 and a transparent electrode 13a are formed, and a light emanating side glass substrate 11b on which black matrix 14, color filters 15a, 15b and 15c and a transparent electrode 13b are formed. The light incident side glass substrate 11a and the light emanating side glass substrate 11b are located so that the transparent electrodes 13a and 13b are opposed to each other and twisted nematic liquid crystal 16 is enclosed between the glass substrates 11a and 11b.

The light projecting means 30 comprises a point light source 31 which may be, for instance, an incandescent lamp or a fluorescent lamp and a micro-louver 32. The micro-louver 32 permits only light components, out of light emitted from the point light source 31, which impinge upon the micro-louver 32 in perpendicular thereto to pass therethrough and absorbs all the light components except the perpendicular light components. Accordingly, the angular distribution of the light passing through the micro-louver 32 can be limited, whereby substantially collimated light can be projected onto the liquid crystal cell system 10.

The operation of the liquid crystal image display system will be described, hereinbelow.

Light emitted from the point light source 31 and passing through the micro-louver 32 is substantially collimated. The substantially collimated light is polarized by the polarizing plate 22a and the phase difference in the light is compensated for by the phase-contrast film 21a. Then the light enters the liquid crystal cell system 10. The transmittance to light of the liquid crystal cell system 10 changes depending upon the electric voltage applied across the transparent electrodes 13a and 13b. That is, orientation of molecules of the twisted nematic liquid crystal changes depending upon the electric voltage, whereby transmittance to light is varied. The color filters 15a, 15b and 15c are red, green and blue filters, respectively. By controlling the electric voltage applied to picture elements, intensities of light passing through the color filters 15a, 15b and 15c which are mixed to make color display are controlled. The light passing through the cell system 10 is compensated for by the phase-contrast film 21b with phase difference generated while passing through the cell system 10, polarized by the polarizing plate 22b and emanates from the light dispersing layer 23 dispersed in every direction by the light dispersing layer 23.

As can be understood from the description above, in the liquid crystal image display system of this embodiment, the substantially collimated light emitted from the light projecting means is compensated for with phase difference and then is caused to enter the liquid crystal cell system 10. Then the light emanates through the light dispersing layer. Accordingly, an image which is high in contrast and low in dependence on the visual angle can be obtained.

A liquid crystal image display system in accordance with an second embodiment of the present invention will be described with reference to FIG. 3, hereinbelow. The image display system of the second embodiment is substantially the same as that of the first embodiment except that the light projecting means differs from that of the first embodiment. Accordingly the elements analogous to those of the first embodiment are given the same reference numerals and will not be described here.

As shown in FIG. 3, the light projecting means 30' in the second embodiment comprises a point light source 31 disposed in a position where it does not face the liquid crystal cell system 10, an optical system 32 which collimates light emitted from the point light source 31 into parallel light and causes the parallel light to travel in parallel to the cell system 10, a reflecting mirror 33 which reflects the parallel light to impinge upon the cell system 10 in perpendicular thereto, and a reflector 34 which reflects light emitted from the light source 31 toward the optical system 32, thereby improving the efficiency of utilization of light from the light source 31. The optical system 32 comprises a Fresnel lens 32b which collimates the light emitted from the point light source 31 and causes the collimated light to travel straight in parallel to the cell system 10 and a condenser lens 32a which condenses the light toward the Fresnel lens 32b.

The operation of the image display system of this embodiment is substantially the same as that of the first embodiment.

As shown in FIGS. 4A and 4B, a plurality of light sources 31 and a plurality of optical systems 32 may be provided for one liquid crystal panel 40. In this case, two or more point light sources 31 may share one reflecting mirror. For example, in the case shown in FIG. 4A, the liquid crystal panel 40 is divided into four regions, that is, region a, region b, region c and region d. The point light sources 31 for the regions may be provided with separate reflecting mirrors. However the point light sources 31 for the regions a and b may share one reflecting mirror and similarly the point light sources 31 for the regions c and d may share one reflecting mirror. In the case shown in FIG. 4B, the liquid crystal panel 40 is divided into two regions, region e and region f. The point light sources 31 for the regions may be provided with separate reflecting mirrors or may share one reflecting mirror.

In the first and second embodiments, various liquid crystals such as vertical array nematic liquid crystal using ECB effect, super twisted nematic liquid crystal, ferroelectric liquid crystal, anti-ferroelectric liquid crystal, dispersion polymer type liquid crystal in which no polarizing plate is necessary and the like may be used in place of twisted nematic liquid crystal. The drive systems for these liquid crystal are broadly divided into a single matrix system and an active matrix system. Though, in the embodiments described above, a tin film transistor system which is one of active matrix systems is used, other drive systems may be used.

An image display system in accordance with a third embodiment of the present invention will be described with reference to FIG. 5, hereinbelow.

FIG. 5 shows a display screen 110 and part of picture elements in the screen 110 of the image display system in accordance with the third embodiment of the present invention. The screen 110 may comprise, for instance, a liquid crystal panel. As shown in FIG. 5, in the screen 110, the density of the picture elements 105 in the horizontal direction (the direction of arrow A) is three times as high as that in the vertical direction (the direction of arrow B) and at the same time, the dimension b in the vertical direction of each picture element 105 is three times as large as the dimension a in the horizontal direction of each picture element 105.

The image signal which is to be reproduced on the screen 110 as a visible image may be one on which picture element density conversion processing has been carried out to conform the image signal to the density of the picture elements and the shape of the picture elements, or one read out on the basis of picture elements whose dimensions in the vertical direction are three times as large as those in the horizontal direction and at the same time whose density in the horizontal direction is three times as high as that in the vertical direction.

For example, it is assumed that the number of picture elements 105 on the screen 110 is 2400×600.

When an image signal made up of 1760×1760 image signal components is to be reproduced on the screen 110, picture element density conversion processing for reducing the number of picture elements in the vertical direction to one third while holding the number of picture elements in the horizontal direction as it is is carried out on the image signal and a visible image is reproduced on the basis of the processed image signal.

When an image signal made up of 1024×1024 image signal components is to be reproduced on the screen 110, picture element density conversion processing for doubling the number of picture elements in the horizontal direction while reducing the number of picture elements in the vertical direction to one half is carried out on the image signal and a visible image is reproduced on the basis of the processed image signal.

When the screen 110, where the density of the picture elements 105 in the horizontal direction is three times as high as that in the vertical direction and at the same time, the dimension in the vertical direction of each picture element 105 is three times as large as the dimension in the horizontal direction of each picture element 105, is for white and black display, the screen can be diverted to a conventional screen for color display by providing red, green and blue filters on each sets of three picture elements adjacent to each other in the horizontal direction. In this case, each set of three picture elements functions as one picture element in the color screen and the color screen is isotropic in the horizontal and vertical directions.

In other words, when a conventional color display is diverted to a white and black display, an image display system which can display an image conforming to the visual sense of viewers can be obtained.

When a screen for white and black display has a picture element density in the horizontal direction higher than three times that in the vertical direction and a ratio of the dimension in the horizontal direction to that in the vertical direction of each picture element smaller than 1:3, a color display system which can display an image conforming to the visual sense of viewers can be obtained by diverting the white and black display system to a color display system.

Though, in the embodiment described above, the screen has a picture element density in the horizontal direction three times as high as that in the vertical direction and picture elements each of which has a dimension in the vertical direction three times as large as that in the horizontal direction taking into account diversion of the screen into a screen for color display, the picture element density and the dimensions of each picture element need not be limited to such.

When the picture element density in the horizontal direction is not lower than about 1.2 times that in the vertical direction, an image display conforming to the visual sense can be obtained. Further when the vertical dimension of each picture element is not smaller than about 1.2 times the horizontal dimension, an image display conforming to the visual sense can be obtained. Preferably the picture element density in the horizontal direction is not lower than three times that in the vertical direction, and the vertical dimension of each picture element is not smaller than three times the horizontal dimension.

Figure 6:
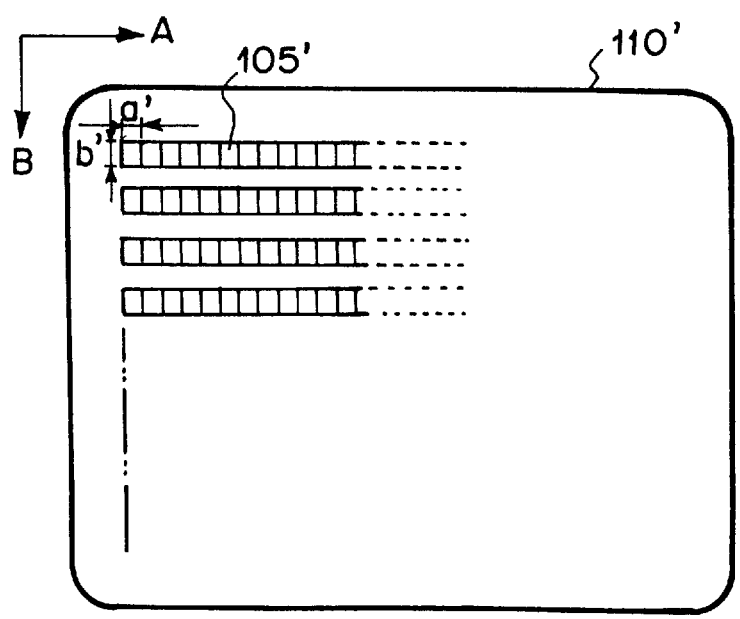
FIG. 6 is a view for illustrating a modification of the image display system shown in FIG. 5.

For example, even if the horizontal dimension a' and the vertical dimension b' of each picture element 105' are equal to each other as shown in FIG. 6, an image display high in response in the horizontal direction can be obtained so long as the picture element density in the horizontal direction is higher than that in the vertical direction. The shape of the picture element need not be rectangular but may be circular or ellipsoidal. When the picture element is ellipsoidal, the major and minor axes may be considered to be the aforesaid vertical and horizontal dimensions, respectively.

When the maximum brightness is not lower than 800 nit, preferably not lower than 1500 nit, an image display excellent in visual contrast can be obtained.

What is claimed is:

1. A liquid crystal display system comprising a liquid crystal cell system formed by sandwiching liquid crystals between a first transparent electrode substrate and a second transparent electrode substrate, the liquid crystal cell system thereby having a first transparent electrode substrate side and a second transparent electrode substrate side and a light source for projecting highly collimated light onto the first transparent electrode substrate, wherein an image is viewed from the second transparent electrode substrate side, wherein the improvement comprises that:

an optical compensation means provided on each of the first transparent electrode substrate side and the second transparent electrode substrate side of the liquid crystal cell system; and a light dispersing layer is provided on the second transparent electrode substrate side of the liquid crystal cell system wherein the dispersing system disperses a projected light formed by said projecting, wherein a projection optical system is used as a back light of a liquid crystal display used for direct viewing.

2. A liquid crystal image display system as defined in claim 1 in which said liquid crystal is twisted nematic liquid crystal.

3. A liquid crystal image display system as defined in claim 1 in which the picture element density of said liquid crystal cell system in the horizontal direction is higher than that in the vertical direction.

4. A liquid crystal image display system as defined in claim 3 in which the dimension of each picture element in the vertical direction is larger than that in the horizontal direction.

5. A liquid crystal display system comprising a liquid crystal cell system formed by sandwiching liquid crystals between a first and second transparent electrode substrates and a light projecting means for projecting highly collimated light onto the first transparent electrode substrate, an image being viewed from the second transparent electrode substrate side, wherein the improvement comprises that said light projecting means is disposed on the first transparent electrode substrate side adjacent thereto and wherein the light projecting means and comprises a point light source disposed in a position where it is near the first transparent electrode substrate and does not face the first transparent electrode substrate a collimating optical system which collimates light emitted from the point light source to a highly collimated parallel light travelling in parallel to the first transparent electrode substrate and a reflecting mirror disposed facing the first transparent electrode substrate and reflects the parallel light to impinge perpendicularly thereto, and a light dispersing layer provided on the second transparent electrode substrate side of the liquid crystal cell system, wherein a projection optical system is used as a back light of a liquid crystal display used for direct viewing.

6. A liquid crystal image display system as defined in claim 5 in which said collimating optical system comprises a Fresnel lens disposed in perpendicular to the first transparent electrode substrate near thereto and a condenser lens which directs light emitted from the point light source toward the Fresnel lens.

7. A liquid crystal image display system as defined in claim 5 in which an optical compensation means is provided on the first transparent electrode substrate side of the liquid crystal cell system.

8. A liquid crystal image display system as defined in claim 7 in which another optical compensation means is provided on the second transparent electrode substrate side of the liquid crystal cell system between the light dispersing layer and the liquid crystal cell system.

9. A liquid crystal image display system as defined in claim 5 in which the liquid crystal cell system is divided into a plurality of regions and a light projecting means is provided for each region.

10. A liquid crystal image display system as defined in claim 9 in which two or more of the light projecting means share one reflecting mirror.

11. A liquid crystal image display system as defined in claim 5 in which said liquid crystal is twisted nematic liquid crystal.

12. A liquid crystal image display system as defined in claim 5 in which the picture element density of said liquid crystal cell system in the horizontal direction is higher than that in the vertical direction.

13. A liquid crystal image display system as defined in claim 12 in which the dimension of each picture element in the vertical direction is larger than that in the horizontal direction.

14. A liquid crystal display system comprising:

a liquid crystal cell system formed by sandwiching liquid crystals between a first transparent electrode substrate and a second transparent electrode substrate, the liquid crystal cell system thereby having a first transparent electrode substrate side and a second transparent electrode substrate side;

a light source for projecting highly collimated light onto the first transparent electrode substrate, wherein an image is viewed from the second transparent electrode substrate side;

an optical compensation means provided on each of the first transparent electrode substrate side and the second transparent electrode substrate side; and a light dispersing layer provided on the second transparent electrode substrate side,
wherein a projection optical system is used as a back light of a liquid crystal display used for direct viewing.

15. A liquid crystal display system comprising:

a liquid crystal cell system formed by sandwiching liquid crystals between a first transparent electrode substrate and a second transparent electrode substrate, the liquid crystal cell system thereby having a first transparent electrode substrate side and a second transparent electrode substrate side;

a light projecting means for projecting light onto the first transparent electrode substrate, wherein an image is viewed from the second transparent electrode substrate side;

wherein said light projecting means is disposed on the first transparent electrode substrate side adjacent thereto and wherein the light projecting means further comprises:

a point light source disposed in a position where it is near the first transparent electrode substrate and does not face the first transparent electrode substrate;

a collimating optical system which collimates light emitted from the point light source to highly collimated parallel light travelling in parallel to the first transparent electrode substrate;

a reflecting mirror disposed facing the first transparent electrode substrate and reflecting the parallel light to impinge perpendicularly upon the first transparent electrode substrate, and a light dispersing layer provided on the second transparent electrode substrate side of the liquid crystal cell system, wherein a projection optical system is used as a back light of a liquid crystal display used for direct viewing.

* * * * *